United States Patent [19]

Delignieres

[11] Patent Number: 4,932,248
[45] Date of Patent: Jun. 12, 1990

[54] METHOD AND DEVICE FOR MEASURING VERTICAL MOVEMENTS IN THE ABSENCE OF A FIXED REFERENCE POINT

[75] Inventor: Robert Delignieres, Mareil Marly, France

[73] Assignee: Institut Francais du Petrole, Rueil Malmaison, France

[21] Appl. No.: 316,785

[22] Filed: Feb. 28, 1989

[30] Foreign Application Priority Data

Feb. 29, 1988 [FR] France ................. 88 02501

[51] Int. Cl.$^5$ .............................................. G01C 13/00
[52] U.S. Cl. .................................................. 73/170 A
[58] Field of Search ............... 73/170 A, 384, 707; 166/336, 355

[56] References Cited

U.S. PATENT DOCUMENTS 2,766,622 10/1956 Johnson .................... 73/170 A X
4,104,608 8/1978 Melling et al. ............. 73/170 A X
4,184,368 1/1980 Frosch ........................ 73/170 A
4,507,971 4/1985 Vachek ....................... 73/707

Primary Examiner—Charles A. Ruehl
Attorney, Agent, or Firm—Antonelli, Terry, Stout & Kraus

[57] ABSTRACT

A method and device are provided for measuring the vertical movements of a floating object, for example, in the absence of a fixed reference point. Using a differential pressure sensor, the pressure difference is measured which prevails at a measurement position on the floating object, between the instantaneous atmospheric pressure and a reference pressure which is the atmospheric pressure prevailing in a container in communication with an element for damping the instantaneous pressure fluctuations, comprising a capillary tube. A regulation loop compensates more particularly for the temperature variations. By means of another loop, the influence of the very slow variations and of the local static pressure on the signal delivered by said sensor may also be corrected. Variations of altitude of 10 cm may for example be measured with said device.

13 Claims, 1 Drawing Sheet

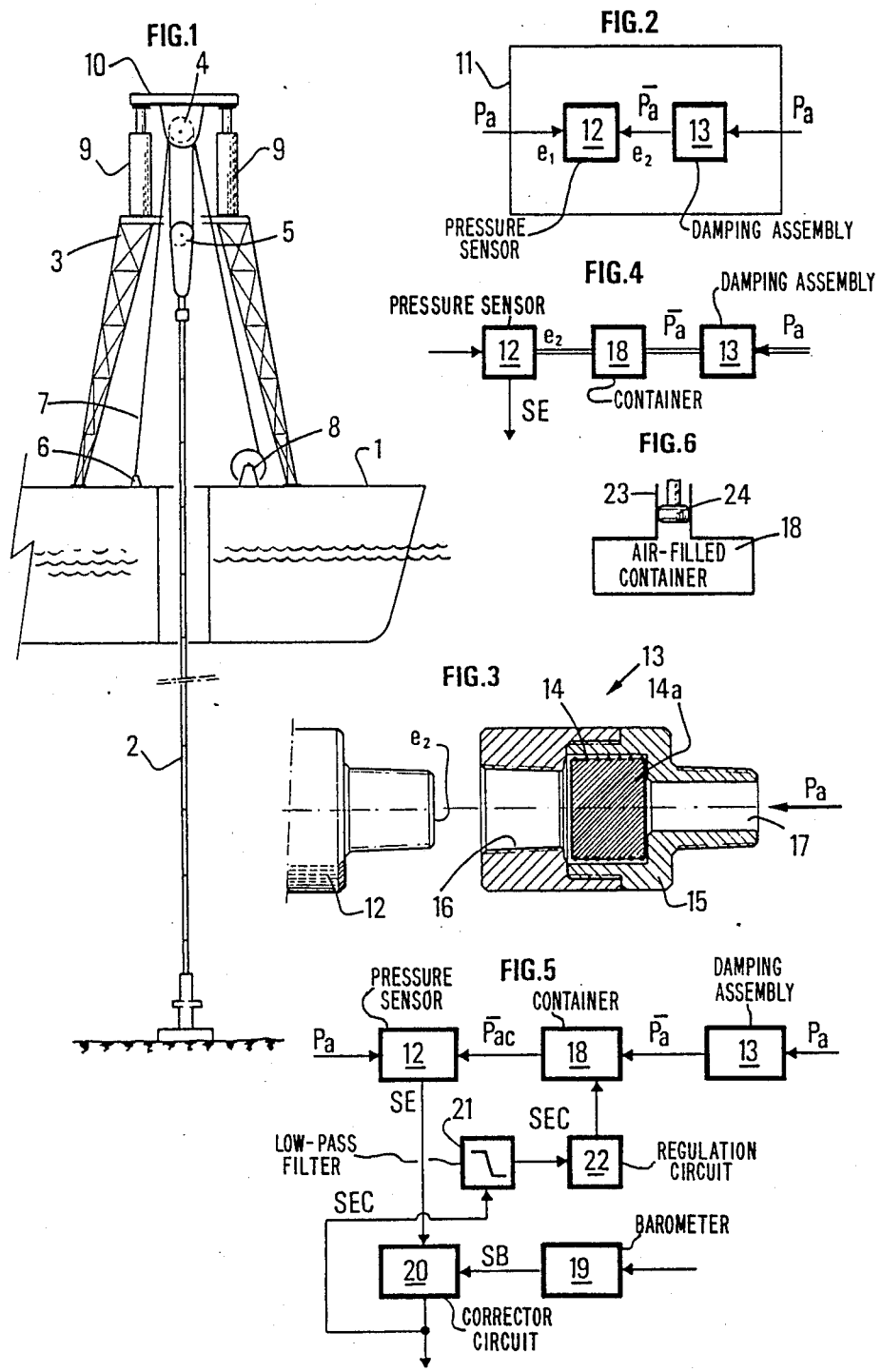

METHOD AND DEVICE FOR MEASURING VERTICAL MOVEMENTS IN THE ABSENCE OF A FIXED REFERENCE POINT

BACKGROUND OF THE INVENTION

The present invention relates to a method and device for measuring vertical movements or the vertical component of these movements in the absence of a reference point.

The method of the invention finds applications more particularly in the marine field for measuring, for example, the movements of any floating object subjected to the motion of the waves. This type of measurement is necessary, for example, when using ships which, for one reason or another, are attached to the sea bed and where it is desirable to remove the connection means from the influence of heaving movements. This is the case of ships supporting, for example, an oil drilling string.

The simplest method of measuring vertical movements is that in which a line is stretched between a fixed position with respect to the bottom of the water and a position on the object, and measuring the variations of length of the line between the two points. This method has however drawbacks because the line to be stretched is very long or else it hinders the manoeuvres.

In, for example, French patent No. 2091906, a method for positioning ships as proposed wherein an acoustic telemetry system comprising several transducers located, for example, in a fixed position with respect to the bottom of the water and transmitting pulses which are received by one or more sensors connected to the moving object. The measurement of the variations of the propagation time of the acoustic pulses makes is possible to calculate the variations of distance between the acoustic wave transmitters and receivers and so the movement of the moving object. But acoustic telemetry methods can only be used for measuring very slow movements because of the propagation time, which is sometimes considerable, of the acoustic waves.

In, for example, U.S. Pat. No. 4,515,013, a method of measuring the movements of an object, without material connection with respect to a fixed reference point, is proposed which consists in measuring the accelerations undergone by the object along one or more axes orthogonal to each other and particularly along the vertical axis and calculating, by integration, the movements of the object which result therefrom.

Although the measurement of the vertical movements alone counts for a considered application, a single accelerometer may also associated with a platform connected to the object, with this platform being stabilized as far as the trim is concerned, either by inertia or by pendular suspension.

But in all cases, the measurement methods using accelerometers are relatively costly.

The method and device of the invention avoid the above mentioned drawbacks.

SUMMARY OF THE INVENTION

The method of the present invention is characterized in that it comprises the measurement of the instantaneous variations of the atmospheric pressure resulting from the vertical movements of the object, with respect to a reference pressure obtained by taking the mean value of the atmospheric pressure in the vicinity of the object.

The method may, for example, comprise the measurement of the instantaneous variations of the atmospheric pressure by differential pressure measurement means.

The device for implementing the method is characterized in that it comprises a differential pressure sensor undergoing the movements of the object, having a first input communicating directly with the atmosphere and a second input communicating with means for damping the fluctuations of the atmospheric pressure, the differential pressure sensor delivering a signal indicative of the movements of the object.

The damping means may comprise, for example, a device for absorbing the dynamic energy of the variations of the atmospheric pressure such as a tube filled with fluid, one end of which communicates with the atmosphere and the other end of which communicates with a second input of the differential pressure sensor.

The device operating in accordance with the claimed method is simpler to construct, more robust and much less costly than prior art devices particularly those comprising acceleration measurements. Additionally, it is very sensitive and, once suitably optimized, capable of detecting altitude variations of a few centimeters. The heaving of any floating object may then be assessed finely. It may also be very easily integrated in a safety device adapted for monitoring the correct operation of a hydraulic stabilization system of the conventional antiheave slide type.

BRIEF DESCRIPTION OF THE DRAWINGS

Other features and advantages of the method and device of the invention will be clear from the following description of one embodiment given by way of non limitative example, with reference to the accompanying drawings in which:

FIG. 1 shows very schematically a drilling installation on a floating support, comprising for example a system for preventing the transmission to a drill string, of the movements of the sea, and in relation with which the device of the invention may be used;

FIG. 2 shows schematically the arrangement of a first embodiment of the device of the invention;

FIG. 3 shows one means for damping the instantaneous fluctuations of the atmospheric pressure of the capillary tube type;

FIG. 4 shows schematically a second embodiment of the device of the invention;

FIG. 5 shows schematically a third embodiment of the device of the invention; and FIG. 6 shows schematically a regulation element which may form part of the circuit of FIG. 5.

DESCRIPTION OF THE PREFERRED EMBODIMENT

The amplitude of heaving movements depends of course on the state of the sea. Measurements have shown that the signal representative of this amplitude is complex. It is periodic and is formed of a main component whose period is generally between 5 and 20 seconds, on which is superimposed a second component whose period is a hundred seconds or so, which causes the mean value of the amplitude to drift. An even slower drift due to the tides affects the variations of amplitude. At normal pressure, a barometric gradient may be measured of the order of 1 millibar (1 mB) for an amplitude variation of 8 meters.

As will be seen from the following description, measurement of the variations of the atmospheric pressure makes it possible to obtain fine indications of the amplitude variations of an object.

Among all the possible applications, there may be mentioned, for example, the measurement of the heaving undergone by a floating installation such as those used in the marine engineering or oil drilling fields. Measurement of the heaving of a floating support from which the ground is drilled through the water layer, is indispensable more particularly for regulating the antiheave systems generally used or for monitoring correct operation thereof. A floating support or ship 1 for drilling the sea bed 1, such as shown schematically in FIG. 1, comprises, in fact, very often a system for preventing the transmission to a drill string 2 of the heaving movements due to the swell. The floating support or ship 1 carries a derrick 3 to which is fixed a support assembly for the drill string 2 comprising two pulley blocks 4, 5. To a fixing element 6 on the floating support or ship 1 is attached the end of cables 7 which pass over the pulleys of the two blocks 4, 5 and are wound on a winch 8. Any antiheave system comprises, for example, hydraulic cylinders 9 to the rods of which is fixed a platform 10 comprising means for supporting the first pulley block 4. Using oleopneumatic means (not shown) it is possible to know or check the sliding of the rods of cylinders 9 so as to maintain the second pulley block 5 and so the drill string 2 which is suspended therefrom at a substantially constant amplitude with respect to the seabed.

An improved heave compensation device is described, for example, in the French patent No. 2 575 452.

Measurement of the heaving undergone by the floating platform or ship 1 is useful first of all for determining the length of sliding for which the antiheave system plays its role correctly under all operating conditions.

Since the load supported by the derrick 3 may reach several hundred tons, it is further necessary to detect very rapidly any operating anomalies. Should the load or piping break, it is necessary to be able to cut off the feed to the high pressure fluid cylinders 9.

The device of the invention may, by its high sensitivity, measure the amplitude of the heaving with precision. If it is disposed on an antiheave slide, it is possible to detect immediately an abnormal variation of the absolute height of the two pulley blocks thereof and so, if necessary, the application of adequate safety measures. The device of the invention will be disposed inside the floating platform or ship 1 or else outside, on moving parts.

The device referenced 11 in FIG. 2 comprises a differential pressure sensor 12 having a first input $e_1$ opening directly to the atmosphere and a second input $e_2$ for the application of a reference pressure Po. The differential pressure sensor 12 measures then the pressure difference $\Delta p$ between the atmospheric pressure Pa and reference pressure Po. This pressure difference is related to the instantaneous altitude deviation h with respect to the altitude Ho corresponding to the reference pressure Po and varies as $h \cdot r(P/\delta H)$ where $\delta P/\delta H$ represents the partial derivative of the pressure as a function of the altitude H. The pressure difference also depends, as will be seen further on, on the influence of the very slow variations which may affect the mean static pressure at the place and at the altitude considered.

The reference pressure Po used is here the mean value $\overline{Pa}$ of the atmospheric pressure detected at any given position on the floating platform or ship 1. This mean value is obtained by a damping assembly generally designated by the reference numeral 13 of known type, capable of substantially eliminating the rapid fluctuations which may occur in the atmospheric pressure and which therefore acts as a high cut-off filter. The dumping assembly 13 comprises, for example (FIG. 3), a capillary tube 14 wound on a mandrel 14A which is clamped in a body 15. At a first end, the capillary tube communicates with a central bore 16 in which the end of the differential pressure sensor 12 is fixed, by a threading, for example, on the second input $e_2$ side. At its opposite end, the capillary tube 14 communicates with a cavity 17 in which prevails the external atmospheric pressure. The passage of air along this capillary tube 14 results in substantially suppressing of the instantaneous fluctuations of the atmospheric pressure. A damper of the same type may also be used but in which the fluid contained in the capillary tube is oil.

The pressure difference $\Delta P$ is therefore related to the instantaneous altitude variation h with respect to the mean altitude H where the pressure $\overline{Pa}$ is measured.

Different types of industrial differential pressure sensors may be used. Those which comprise a quartz Bourdon tube, those which operate by measuring the movements of a membrane by a Wheatstone bridge, or else by a magnetic reluctance measurement with the sensitivity being very variable. The most sensitive may measure at full scale a pressure difference of 1 mB with an accuracy of 0.25%, for example. With their resolution of 0.01 mB, it is then possible to measure a theoretic variation of altitude of 8 cm.

The differential pressure sensor 12 delivers a signal SE proportional to the pressure difference measured between the first and second inputs $e_1$ and $e_2$, and determined in accordance with the following relationship:

$$SE = k(Pa - \overline{Pa}),$$

where k is a coefficient of proportionality and thus a signal proportional more particularly to the altitude deviations h.

In the embodiment of FIG. 4, an air filled container 18 has been inserted between the differential pressure sensor 12 and the damping assembly 13. At a first end, the air filled container 18 communicates with second input $e_2$ of the differential sensor 12. At its opposite end, the air filled container 18 communicates with a capillary tube 14 of the damping assembly 13. The volume Vo of the air filled container 18 has been chosen so that it is very large with respect to the volume variations dv due to the pressure fluctuations and, for example, Vo=1000 dv. This further increases very substantially the damping effect provided by the damping assembly 13 and maintains all the sensitivity of the differential pressure sensor 12. Preferably, means are added to the embodiment of FIG. 4 for minimizing the possible temperature variations. The simplest means consists in leaving the inside of the air-filled container 18 in communication with the external atmosphere through the damping assembly 13 so as to balance out the variations of the air-filled container 18 and of the contents. A better regulation as a function of the temperature is obtained by lagging the differential pressure sensor 12, air-filled container 18 and the damping assembly 13.

To take into account also the influence on the measurements of the possible variations at the place and altitude considered, of the mean static pressure and of the temperature, and so as to make the altitude variation measurements finer, the embodiment of FIG. 5 is preferably used.

The embodiment of FIG. 5 comprises the differential pressure sensor 12, the damping assembly 13 and the air filled container 18 of the schematic diagram of FIG. 4. It further comprises a first correction loop including a barometer 19 adapted for measuring the atmospheric pressure at the altitude considered which atmospheric pressure varies as a function of the local meterological conditions. The signal SB generated by the barometer 19 as well as the signal SE from the differential pressure sensor 12 are applied to a corrector circuit 20 which calculates the ratio (SE·SN)/SB and produces a corrected signal SEC. The signal SN represents the normal atmospheric pressure at the altitude considered. It is here a constant (equal to 1013 mbar at sea level).

The device also comprises a second (optional) regulation loop for an even better correction of the influence of the temperature on the variation measurements and completing the regulation means mentioned in the description of the embodiment of FIG. 4 (venting and lagging air-filled container 18). This second loop comprises a low pass filter 21 for extracting the very low frequency component $\overline{SEC}$ from the signal SEC produced by the correction circuit 20. It represents the drift of signal SEC particularly as a function of the temperature in the air filled container 18. The signal $\overline{SEC}$ is applied to a regulation circuit 22 which applies an appropriate regulation to air filled container 18. The latter may comprise electric heating resistances and, in this case, the regulation circuit applies, if required, a variation of the temperature for cancelling out the difference.

The air filled container 18 may also be provided with a tube 23 (FIG. 6) slidingly accommodating a piston 24 in a sealed manner. In this case, the regulation circuit controls the movement of the piston 24 in cylinder 23 so as to vary the total volume of air filled container 18 and compensates for the measured variation of the temperature. These examples of regulation are not limitative.

What is claimed is:

1. A method for measuring one of vertical movements of an object and a vertical component of movements of the object in an absence of a fixed reference point, the method comprising the steps of obtaining a reference pressure by taking a mean value of an atmospheric pressure in a vicinity of the object, and measuring instantaneous variations of atmospheric pressure resulting from the vertical movements of the object with respect to the reference pressure.

2. The method as claimed in claim 1, wherein the step of measuring includes obtaining a differential pressure between the atmospheric pressure and the reference pressure by differential pressure measurement means.

3. A device for measuring one of vertical movements of an object and a vertical component of movements of the object in an absence of a fixed reference point, the device comprising damping means for damping fluctuations of atmospheric pressure, a differential pressure sensor means undergoing the movements of the object including a first input means for communicating directly with the atmosphere, and a second input means for communicating with said damping means whereby said differential pressure means delivers a signal indicative of the movements of the object.

4. The device as claimed in claim 3, wherein the damping means comprise a means for absorbing dynamic energy of variations of the atmospheric pressure.

5. The device as claimed in claim 3, wherein said damping means comprise a capillary tube means having a first end communicating with the atmosphere and a second end communicating with the second input means of said differential pressure sensor means.

6. The device as claimed in claim 3, wherein the second input means communicates with a gas volume held at equal pressure with a reference pressure produced by the damping means.

7. The device as claimed in claim 6, further comprising container means for containing said gas volume, and means for making the reference pressure produced by the damping means substantially independent of temperature variations.

8. The device as claimed in claim 7, further comprising means for correcting reference pressure variations resulting from slow variations of the atmospheric pressure.

9. The device as claimed in claim 3, further comprising a first regulation loop including means for measuring a reference pressure, and means for correcting the signal delivered by said differential pressure sensor means as a function of the signal produced by said measuring means.

10. The device as claimed in claim 9, further comprising a second regulation loop for correcting an influence of temperature variations on measurements by said measuring means including a low pass filter means for extracting very low frequency components from the signal produced by the differential pressure sensor means, and compensation means for compensating for variations of the reference pressure measured by said measuring means.

11. The device for measuring one of vertical movements of an object and a vertical component of movements of the object in an absence of a fixed reference point, the device comprising a damping means for damping fluctuations of atmospheric pressure, a differential pressure sensor means undergoing the movements of the object including a first input means for communicating directly with the atmosphere, a second input means for communicating with said damping means whereby said differential pressure sensor means produces a signal indicative of the movements of the object, a first regulation loop including means for measuring a reference pressure, means for correcting the signal delivered by said differential pressure sensor means as a function of the signal produced by said differential pressure sensor means, and compensation means comprising means for varying a temperature of a gas volume held at equal pressure with the reference pressure.

12. A device for measuring one of vertical movements of an object and a vertical component of movements of the object in an absence of a fixed reference point, the device comprising a damping means for damping fluctuations of atmospheric pressure, a differential pressure sensor means undergoing the movements of the object including a first input means for communicating directly with the atmosphere, a second input means for communicating with said damping means whereby said differential pressure sensor means produces a signal indicative of the movements of the object, a first regulation loop including means for measuring a reference pressure, means for correcting the signal delivered by said differential pressure sensor means as a function of the signal produced by said measuring means, and compensation means comprising means for varying a volume of a container containing a gas volume at an equal pressure with the reference pressure.

13. A device for measuring vertical movements of a support assembly connected to a floating vehicle by an antiheave means for removing said support assembly from any influence of the vertical movements undergone by the floating vehicle, in the absence of a fixed reference point, the device comprising a differential pressure sensor means fixed to the support assembly including a first input means communicating directly with the atmosphere, and a second input means communicating with a damping means for damping instantaneous fluctuations of atmospheric pressure, said differential pressure sensor means delivering a signal indicative of the movements of the assembly.

* * * * *